US008022941B2

(12) United States Patent
Smoot

(10) Patent No.: US 8,022,941 B2
(45) Date of Patent: Sep. 20, 2011

(54) MULTI-USER TOUCH SCREEN

(75) Inventor: Lanny Starkes Smoot, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1165 days.

(21) Appl. No.: 11/549,096

(22) Filed: Oct. 12, 2006

(65) Prior Publication Data

US 2008/0088593 A1  Apr. 17, 2008

(51) Int. Cl.
*G06F 3/042* (2006.01)
*G06F 3/041* (2006.01)

(52) U.S. Cl. ............ 345/175; 345/173; 178/18.01; 178/18.09

(58) Field of Classification Search .......... 345/173–178, 345/204, 94–96; 178/18.01–18.11; 463/37
See application file for complete search history.

(56) References Cited

U.S. PATENT DOCUMENTS

| 4,346,376 | A | | 8/1982 | Mallos |
| 4,868,912 | A | | 9/1989 | Doering |
| 5,105,186 | A | | 4/1992 | May |
| 5,677,700 | A | | 10/1997 | Schwalba et al. |
| 5,929,834 | A | | 7/1999 | Inoue et al. |
| 6,040,825 | A | * | 3/2000 | Yamamoto et al. ........... 345/173 |
| 6,061,177 | A | * | 5/2000 | Fujimoto ....................... 359/443 |
| 6,100,538 | A | * | 8/2000 | Ogawa ....................... 250/559.29 |
| 6,172,667 | B1 | | 1/2001 | Sayag |
| 6,175,679 | B1 | | 1/2001 | Veligdan et al. |
| 6,293,038 | B1 | * | 9/2001 | Chang ............................. 40/738 |
| 6,321,605 | B1 | * | 11/2001 | Gagnon .................... 73/862.046 |
| 6,333,735 | B1 | | 12/2001 | Anvekar |
| 6,400,836 | B2 | | 6/2002 | Senior |
| 6,421,042 | B1 | * | 7/2002 | Omura et al. .................. 345/157 |
| 6,429,857 | B1 | | 8/2002 | Masters et al. |
| 6,504,530 | B1 | | 1/2003 | Wilson et al. |
| 6,774,889 | B1 | | 8/2004 | Zhang et al. |
| 6,798,403 | B2 | | 9/2004 | Kitada et al. |
| 6,803,906 | B1 | | 10/2004 | Morrison et al. |
| 6,879,319 | B2 | | 4/2005 | Cok |
| 7,106,307 | B2 | | 9/2006 | Cok |
| 7,184,030 | B2 | * | 2/2007 | McCharles .................... 345/173 |
| 7,310,090 | B2 | * | 12/2007 | Ho et al. ......................... 345/175 |
| 7,705,835 | B2 | * | 4/2010 | Eikman .......................... 345/176 |
| 2004/0012573 | A1 | | 1/2004 | Morrison et al. |
| 2004/0061689 | A1 | | 4/2004 | Ito |
| 2004/0108996 | A1 | | 6/2004 | McCharles et al. |
| 2004/0145575 | A1 | | 7/2004 | Weindorf et al. |
| 2004/0178993 | A1 | | 9/2004 | Morrison et al. |

(Continued)

FOREIGN PATENT DOCUMENTS

EP          0135391        3/1985

(Continued)

*Primary Examiner* — Lun-Yi Lao
*Assistant Examiner* — Sosina Abebe
(74) *Attorney, Agent, or Firm* — Marsh Fischmann & Breyfogle LLP; Kent A. Lembke

(57) ABSTRACT

A multi-user touch-responsive viewing screen is described which uses frustrated total internal reflection in a slab of transparent material to illuminate the contact point between the slab and a finger or other object substantially matching the slab's index of refraction. Light, coupled upon touch, can be detected with a video camera, and used to determine both the position and pressure of the touch. Multiple touches can be accommodated and each touch accurately located. Projected images can be applied to the slab and a diffuser to construct an interactive touch screen.

47 Claims, 13 Drawing Sheets

U.S. PATENT DOCUMENTS

| | | |
|---|---|---|
| 2004/0201575 A1 | 10/2004 | Morrison |
| 2004/0207600 A1 | 10/2004 | Zhang et al. |
| 2005/0037184 A1 | 2/2005 | Halsey, IV et al. |
| 2005/0088424 A1 | 4/2005 | Morrison et al. |
| 2008/0029691 A1* | 2/2008 | Han .............................. 250/224 |
| 2009/0267919 A1* | 10/2009 | Chao et al. .................... 345/175 |

FOREIGN PATENT DOCUMENTS

| | | |
|---|---|---|
| EP | 0572009 | 12/1993 |
| GB | 2238866 | 6/1991 |
| JP | 2004094569 A * | 3/2004 |

* cited by examiner

MULTI-USER TOUCH SCREEN

BACKGROUND OF THE DISCLOSURE

1. Field of the Disclosure

The present disclosure relates to interactive projection systems. In particular, it relates to entertainment projection systems to provide an illusory reality to the observer.

2. General Background

Current touch screen systems permit companies to provide their customers the ability to instruct interactive systems by simply touching a surface. Examples are the touch-screens often mounted on computer displays, or the various touch screens used to indicate pointing in connection with automatic teller machines, industrial controllers, entertainment, transportation, etc.

Various X-Y position measurement systems are typically used to determine the position of a finger, or a stylus on their surface. For instance, in resistive type touch-pads the position of a finger provides the "wiper" location in a voltage dividing potentiometer. The divider is formed by a resistive membrane that is shorted to a conductive layer where the finger presses against the resistive membrane. It then becomes possible to measure the resistance of the divider formed by the finger's position relative to the edges of the membrane. In the case of a capacitance sensing system, the same general principle is employed except the fingertip position is determined by a capacitance divider effect.

Current systems can generally detect only a single touch, and cannot distinguish or disambiguate two fingers placed on the surface simultaneously. Indeed, two-fingertip touches are often interpreted as a single event at the geometric center of the two points of contact.

SUMMARY

A touch-screen system and method is described herein that utilizes the internally reflected light that leaks from a transparent slab of optical material when touched by a fingertip to detect the position and pressure of the touch. The light is injected into the slab by one or more light sources (e.g., infrared LEDs) mounted facing inward around the edge of the slab. A portion of the light injected at the edges of the slab is captured by total internal reflection between the parallel and smooth, top and bottom surfaces of the slab. When a fingertip encounters one of the two faces of the slab, light leaks from the slab and couples into the fingertip.

In one embodiment, the slab is viewed from the same side as the fingertip touch by a video camera sensitive to the wavelength used to illuminate the slab. A camera images the light that couples into the finger from the slab, by means of the scatter around the bone through the flesh of the finger. The camera's signal is analyzed by a computer system that can determine both the position (X-Y) of the touch on the slab, and its pressure, by determining the amplitude of the scattered light. The information can then be relayed to a computer system for positioning of images.

In another embodiment, the video camera can be on the opposite side of the slab from the finger touch. Thus, the light that leaks from the slab is viewed through the slab via the diffuse scattering of the flesh in contact with the surface of the slab.

The touch-detection method and system can be combined with the projection of video information onto a translucent surface that is parallel to the touch screen. Furthermore, the translucent surface can be adjacent to the slab. Optical filters are used to prevent interference between the projected information and light used to detect touches.

In one aspect, there is a system to detect touch on a touch-screen surface. The system includes a transparent slab, at least one light source and a camera. The transparent slab comprises a top and a bottom surface, and at least one side edge. The at least one light source placed to inject light in the at least one side edge of the transparent slab, wherein the light injected in the transparent slab is totally internally reflected in the transparent slab. The camera can be configured to capture at least one spot of light in the transparent slab, wherein the spot of light is created by a user touching the transparent slab with a body part, wherein the touch of the user on the transparent slab disrupts the total internal reflection of a portion of the light thereby causing the portion of the light to be refracted into the body part of the user.

In another aspect, the transparent slab further comprises a transparent sheet applied on the top surface of the transparent slab in order to protect the transparent slab. The system can further comprise a video processing system that includes a video peak detector to detect the X and Y position and brightness of blobs of light on the transparent slab.

In another aspect, the camera captures as a video frame the portion of the light refracted into the body part of the user, the video frame being transmitted to a computer system as user input. The computer system, as a response to the user input, can transmit to a projector an image to be projected on a projection screen, the projection screen being separate from the transparent slab. In another aspect, the image can be projected on computer monitor, diffusing surface, etc.

In yet another aspect, the camera is a shutter camera configured to capture a first video frame comprising a spot of light in the transparent slab when the at least one light source is turned on, wherein the camera is further configured to capture a second video frame with the shutter camera so as to capture the ambient light when the at least one light source is turned off. A subtractor can be utilized to subtract the second video frame from the first video frame to create a third video frame that excludes ambient light, wherein the third video frame includes a signal representative of the touch of the user on the transparent slab. A first frame store is provided wherein the first frame is stored before subtraction occurs, and a second frame store is provided wherein the second frame is stored before subtraction occurs. A synchronizing unit can be configured to simultaneously send a signal to the shutter camera and to the at least one light source such that the shutter camera can capture the first frame when the at least one light source is on and the second frame when the at least one light source is off.

In one embodiment, there is a system to detect touch on a touch-screen surface comprising a transparent slab, at least one light source, a first shutter camera, a second shutter camera, and a subtractor. The transparent slab comprising a top and a bottom surface, and at least one side edge. The at least one light source placed to inject light in the at least one side edge of the transparent slab, wherein the light injected in the transparent slab is totally internally reflected in the transparent slab. The first shutter camera can be configured to capture a first video frame comprising a spot of light in the transparent slab when the at least one light source is turned on. The spot of light is created by a user touching the transparent slab with a body part, wherein the touch of the user on the transparent slab disrupts the total internal reflection of a portion of the light thereby causing the portion of the light to be refracted into the body part of the user. The second shutter camera configured to capture a second video frame comprising ambient light near the transparent slab when the at least one light source is turned off. The subtractor subtracts the second video frame from the first video frame to create a third video frame that excludes ambient light. The third video frame includes a signal representative of the touch of the user on the transparent slab.

In a further aspect, there is a method of detecting touch on a touch-screen surface. A transparent slab comprising a top surface and a bottom surface, and at least one side edge is provided. In addition, a flexible diffusing sheet applied on the top surface of the transparent slab is also provided. The flexible diffusing sheet can be separated from the transparent slab by separators that create a thin layer of air. Light is injected into the transparent slab by placing at least one light source on the at least one side edge of the transparent slab. The at least one light source being placed so as to cause light injected in the transparent slab to be totally internally reflected in the transparent slab so that the top surface and the bottom surface of the transparent slab emit a minimum amount of light. A pressing touch is received on the flexible diffusing sheet. The pressing touch causes a portion of the flexible diffusing sheet to make contact with a portion of the top surface of the transparent slab. The contact between the flexible diffusing sheet and the portion of the top surface of the transparent slab disrupts the total internal reflection of a portion of the light thereby causing the portion of the light to be refracted into the flexible diffusing sheet. A camera can then capture the portion of the light refracted into the flexible diffusing sheet due to the pressing touch on the flexible diffusing sheet.

In one aspect, there is yet another method of detecting touch on a touch-screen surface. A transparent slab comprising a top surface and a bottom surface, and at least one side edge is provided. A transparent yielding sheet is applied on the top slab surface of the transparent slab, wherein the transparent yielding sheet has an index of refraction substantially similar to the index of refraction of the transparent slab, the transparent yielding sheet comprising a top sheet surface and a bottom sheet surface. Light is then injected into the transparent slab by placing at least one light source on the at least one side edge of the transparent slab. The at least one light source being placed so as to cause light injected into the transparent slab to be totally internally reflected in the transparent slab and transparent yielding sheet, so that the top sheet surface and the bottom slab surface emit a minimum amount of light. A pressing touch is received on the top sheet surface with a body part. The pressing touch causes a portion the transparent yielding sheet to deform to the shape of the pressing touch. The pressing touch disrupts the total internal reflection of a portion of the light thereby causing the portion of the light to be refracted into the body part. Finally, a camera captures the portion of the light refracted into the body part due to the pressing touch on the flexible sheet.

DETAILED DESCRIPTION

A touch-screen system and method is disclosed, where the light is trapped within a transparent slab with a higher index of refraction than the media surrounding the slab. The light is generally introduced at the edges of the slab. A portion of the light is captured within the slab since some of it is propagated at less than the critical angle to its surface so that the slab's inner surface acts as a loss-less mirror. This guided light remains substantially trapped within the slab until the light encounters an edge of the slab, or with an object with an index of refraction that is close to that of the slab. Such a matching interface can exist between the surface, and for instance, a human fingertip. At the point of contact with a fingertip, light from the slab leaks out of the slab and into the skin of the fingertip. This light is both reflectively scattered, and diffusely transmitted, by the amorphous skin tissue of the fingertip, and can be viewed from the side of the slab opposite the touch as skin-scattered light passing through the slab, or from the same side of the slab as the finger, as light which is guided through the flesh of the finger.

An external camera, sensitive to the wavelength of the light used to flood the slab, can detect this contact-based light. As such, the camera detects the presence of light on the finger of the user. Because the finger is lit up when in contact with the slab, the light concentrated in the finger, and around the finger, can be captured and imaged by a camera on either side of the slab.

Video processing circuitry can determine the position of any number of these contact points, and can also determine the pressure with which the contacts are made since the amount of escaping light increases with the finger touch surface area, and therefore with pressure.

Unlike current systems that do not easily allow the pressure of the touch to be determined and are difficult to apply to curved surfaces, the present system offers multi-touch capability on flat or curved surfaces, and permits the detection of touch pressure.

Figure 1:
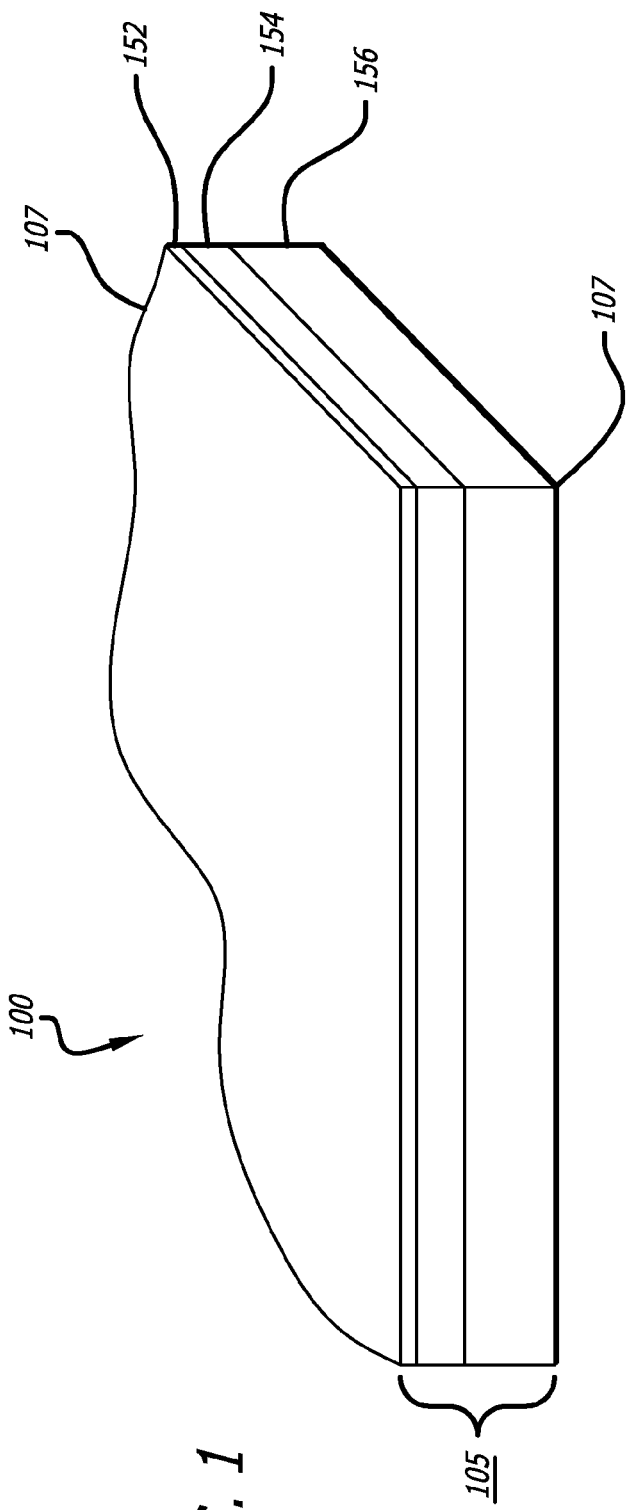
FIG. 1 illustrates a cross-sectional view of a laminated slab.

FIG. 1 illustrates a cross-sectional view of a laminated slab 100. The slab 100 is shown in a horizontal position such as could be applied to a tabletop or writing surface. The slab 100 can be made of optically transparent material such as a homogeneous sheet of plastic or glass. In one embodiment, where it is desired to provide, for instance, the abrasion resistance of glass and the low cost of plastic, a thin layer of glass 154, can be laminated to a thicker plastic portion 156. A sacrificial topcoat 152 of abrasion resistant transparent material can be applied to further protect the slab 100. The slab 100 has a top and bottom surfaces 107, as well as an edge 105, which can be smooth to provide for better transparency.

Figure 2:
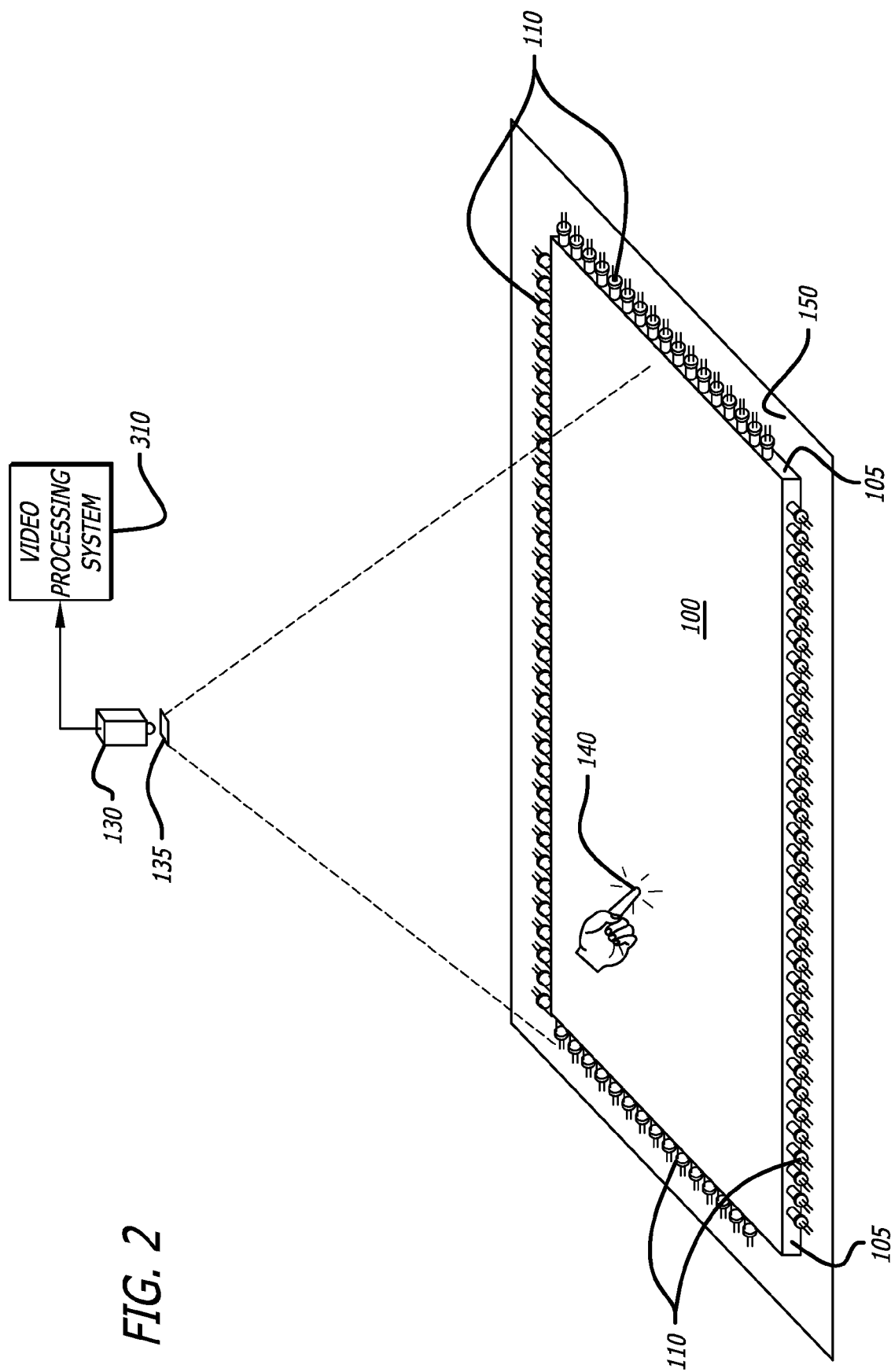
FIG. 2 illustrates a touch-screen system being viewed by a camera on the same side as a fingertip touch.

FIG. 2 illustrates a touch-screen system being viewed by a camera on the same side as a fingertip 140 touch. The slab 100 can be bordered by light emitting diode (LED) illuminators 110. In one embodiment, the LED illuminators 110 can be commonly available high-power near-infrared LEDs, emitting light at a wavelength in a range of, for instance, 780 to 1000 nanometers since this illumination is invisible to the human eye and therefore unobtrusive. Furthermore, light of such wavelengths can be easily detected by low-cost CCD video cameras. A typical LED suitable for use here is HSDL-4320 from Agilent Technologies. In another embodiment, the LED illuminators 110 emit another form of light or electromagnetic energy such as ultraviolet light, visible light, near-infrared, far-infrared, etc.

The LED illuminators 110 can be placed on the edges 105 of slab 100 by the use of a mounting bracket (not shown) with holes drilled to mount LED illuminators 110. In one embodiment, the bracket can be placed around the perimeter of the slab 100 so as to prevent a halo of light to form as a resultant of the refracted light off of the edges 105. In another embodiment, the bracket can be reflective so as to help stray light leaving through the sides 105 of slab 100 to be reflected back into slab 100. In yet another embodiment, the bracket can be black in order to absorb the light leaving through the sides 105 of slab 100. The number of LED illuminators 110 required can vary, depending on their optical output power and the transmissivity of slab 100 at the wavelength of illuminating light chosen. In one embodiment, a slab 100 made of 0.5-inch thick Plexiglas that is approximately 3 feet wide by 4 feet long, and using 880 nm HDSL-4320 LEDs, can have the LED illuminators 110 placed on approximately three inch centers surrounding the entire slab 100.

In one example, the edges 105 of Plexiglas slab 100 can be left in a roughened or saw-cut condition. The rough edges tends to diffuse light entering slab 100, and also provide a better cosmetic appearance when looking through the top surface of slab 100 at an oblique angle, at edges 105 since individual LED illuminators 110 cannot be seen.

The LED illuminators 110 can be connected in series, or in parallel (with small ballast resistors) or in series/parallel strings to power them. The wiring (not shown in the figure) running to the LED illuminators 110 along the slab 100 edges can be covered with a decorative edge bezel (also not shown).

In operation, the light from LED illuminators 110 enters the edges 105 of slab 100, which can be made of glass, or plastic that is transparent at the wavelengths employed in the system. In one embodiment, the light enters the glass at less than the critical angle. A portion of the light entering the edges 105 of the slab is captured in internal reflection. Because the index of refraction of slab 100 (e.g. between 1.4 to 1.6 for most plastics and glass) is higher than that of the air surrounding the slab 100, some of the light that enters slab 100 is captured by total internal reflection, and bounces at a shallow angle against the top and bottom surfaces 107.

A camera 130 sensitive to the wavelength (e.g. near-infrared light) of the LED illuminators can be used to observe the slab 100. The camera 130 can include an optical filter 135 mounted in front of the camera's 130 lens. The optical filter 135 has the capability to pass as much of the wavelength of light emitted by LED illuminators 110 as possible, while rejecting any ambient light of other wavelengths that can be present near slab 100. Camera 130 can be adjusted to be focused on the top surface of slab 100 so that the surface of slab 100 fills as much of the field of view of camera 130 as possible. In one example, if slab 100 is a rectangular surface with a 3 to 4 aspect ratio then it can be viewed with a low-cost RS-170 (3×4 aspect ratio image) type infrared camera. In another embodiment, the camera 130 can be framed to view a smaller area of slab 100 such that the LED illuminators 110 are excluded from the field of vision of the camera 130. Thus, the camera 130 capturing the frustration of total internal reflection does not capture direct light from LED illuminators 110.

A fingertip 140 placed in contact with slab 100 can receive light energy due to the frustration of the totally internally reflected light captured in slab 100. The light energy originally internally reflected in the slab 100 is refracted to the finger of the user and can be reflectively scattered throughout the fingertip 140. For instance, the light can travel upwards through the skin, around the bone, and emerge from the top of the fingertip to be detected by camera 130. The leakage of light off the slab 100 onto the finger causes the finger to light up. Because camera 130 is configured to capture and image wavelengths in the same range as the light emitted LED illuminators 110, the camera 130 can capture the spot of light that increased in light intensity. Likewise, the light can travel downwards through the slab 100 by diffuse reflection from the surface layers of the skin of fingertip 140.

In another embodiment, a layer 150 of light scattering material is placed beneath slab 100. The layer 150 can permit the light scattered by the underside of the fingertip 140 to be reflected back towards the fingertip 140, or around the edges of the fingertip 140, and upwards towards camera 130 thus adding to the amount of visible infrared light viewed by camera 130. Moreover, if layer 150 only reflects infrared light, the interfering diffuse light in the vicinity of slab 100 will not enter camera 130. Thus, camera's 130 detection of finger-touch light is improved because the signal-to-noise ratio (where the signal is the touch point light and the noise is the ambient light in the vicinity) is increased. Once the infrared light passes through filter 135 and is captured by camera 130, the infrared red light signals are sent to a video processing system 210.

Figure 3:
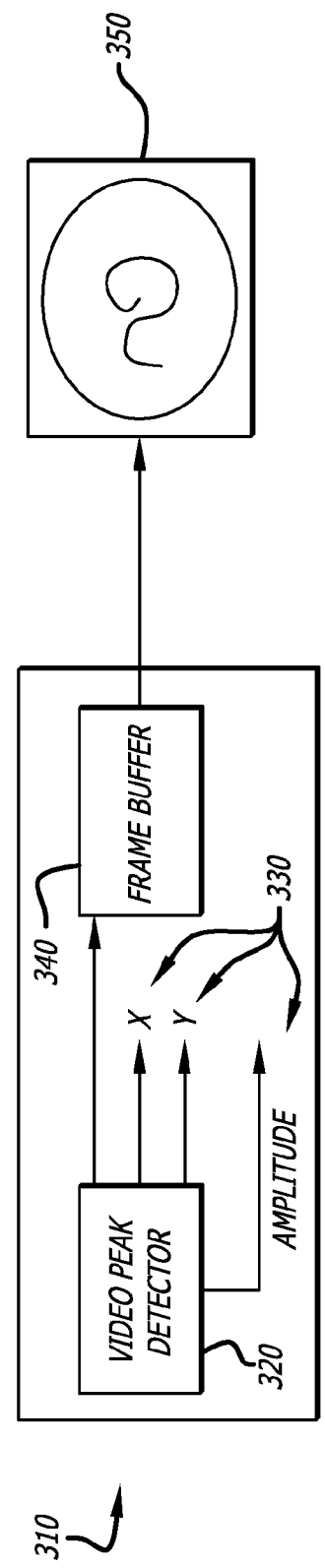
FIG. 3 illustrates a component view of a video processing system.

FIG. 3 illustrates a component view of a video processing system 310. The video processing system 310 comprises a video peak detector 320 and frame buffer 340. Video peak detector 320 can be a computer-based vision system which can perform blob analysis to determine the X and Y position brightness (amplitude) of the individual blobs of light caused by each fingertip 140 touch slab 100. The video peak detector 320 determines the X and Y position of the fingertip 140 by comparing the brightness of each of the located blobs to the background level where no touch is applied.

As blobs of light are created by the fingertip 140 pressing on a point on the slab 100, or as lines are created as a locus by the dragging of fingertip 140 on surface 100, the frame buffer 340 retains a record of this touch information. Lines or characters that were drawn on the surface 107 and stored in frame buffer 340 can later be displayed as shown on video monitor 350.

The pressure with which the surface is being touched can be determined since the spot of light becomes brighter as more of the finger's flesh is flattened into contact with the slab 100. The pressure information can be used to control the level of an interactive action. Pressure information is useful in, for instance, musical applications wherein the touch surface is used to simulate the keys of a musical instrument, or the surface of a percussive instrument such as a drum.

In another embodiment, the speed at which the fingertip's 140 flesh is flattened against the slab 100 can be used to determine the velocity of touch. Greater touch velocities can be determined if a brighter instantaneous spots of light followed by absence of touch is detected.

Alternatively, peak detector 320 can simply deliver the X-Y coordinates of any or all of the individual touches in order to direct the action of another computer program such as a browser for the World Wide Web.

Improved Detection in the Presence of Ambient Light

Figure 4:
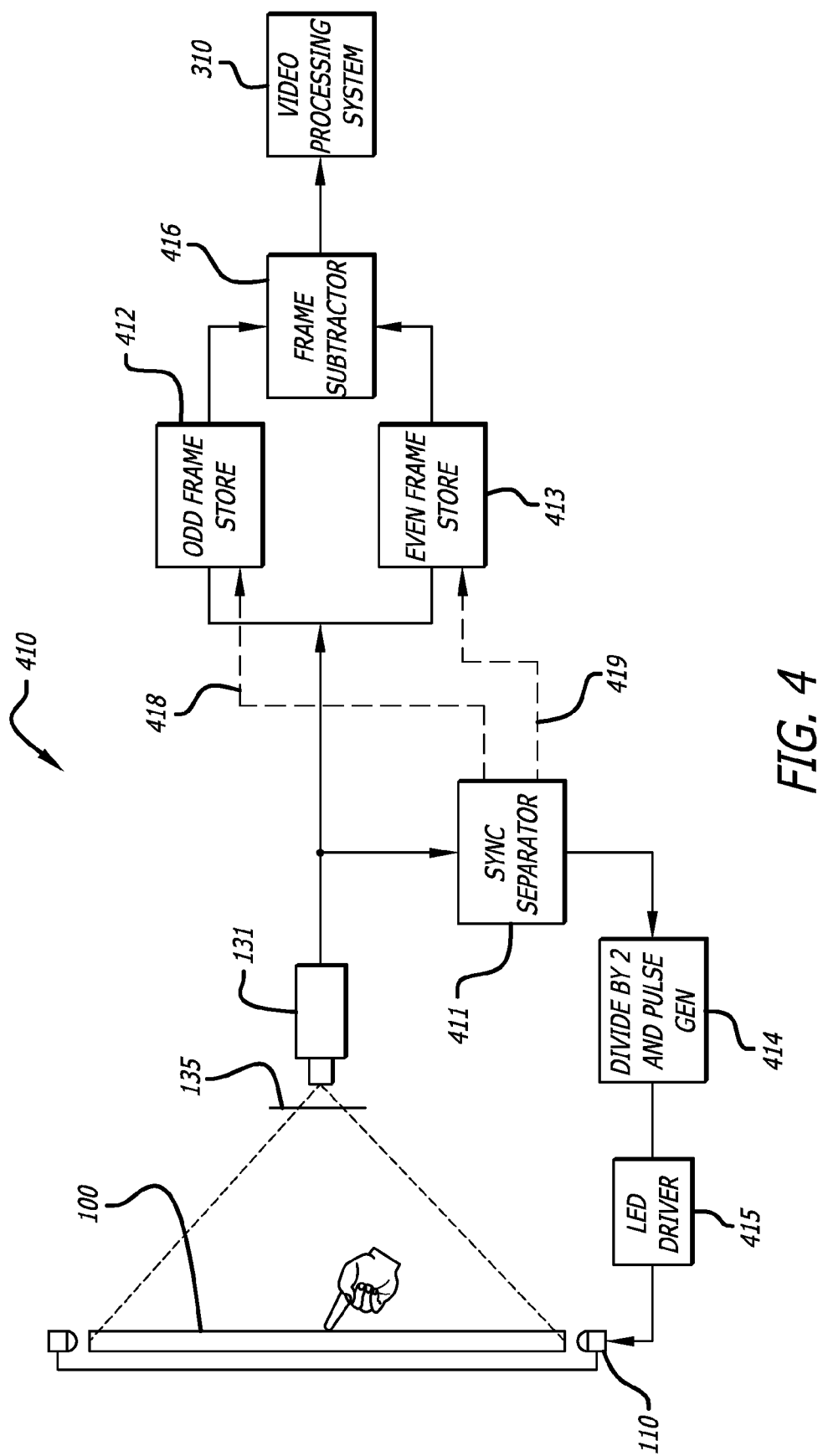
FIG. 4 illustrates a touch-screen system to increase the signal-to-noise ratio.

FIG. 4 illustrates a touch-screen system to increase the signal-to-noise ratio. Ambient light (from say local florescent or incandescent lights) sometimes may overlap with the wavelength spectrum of the LED illuminators 110, which may in turn cause false readings of touch. The touch-screen system 410 allows for amplified detection of light while ignoring ambient light.

In one embodiment, the touch-screen system 410 can include a shutter camera 131 capable of acquiring images during a small fraction of a normal video frame or field acquisition time. While a normal video frame (for RS-170 type cameras) would ordinarily be acquired over the substantial portion of a thirtieth of a second, the shutter camera 131 can acquire a complete frame in a thousandth of a second (while playing the frame (two fields) out at the usual thirtieth of a second rate). In one approach, a camera suitable for this application would be the Pulnix Model TM-9701 full-frame shutter camera.

The output of shutter camera 131 can be applied to the input of controller 410 comprising a sync separator 411, an odd frame store 412, an even frame store 413, a frame subtractor 416, logic circuitry 414, and an LED driver 415.

Figure 5A:
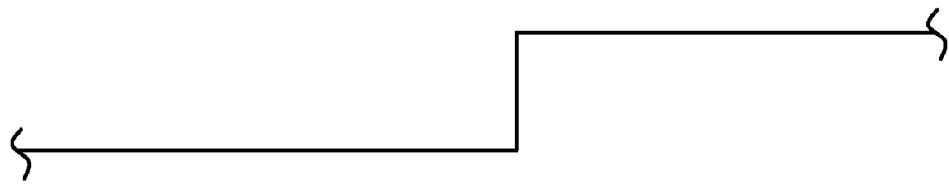
FIGS. 5A-5C illustrate the video waveforms corresponding to the frame subtraction technique for increasing signal-to-noise ratio.
Figure 5B:
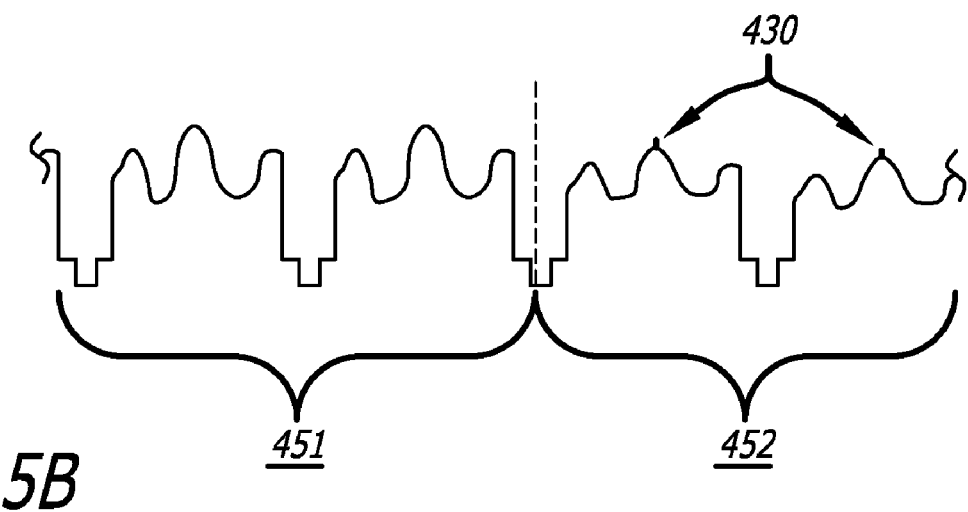

The touch-screen system 410 works to increase the immunity to ambient light of the overall system. In order to achieve this, sync separator 411 detects the vertical sync pulses (shown in FIG. 5B) generated by shutter camera 131 for each frame 451 and 452 (frames consist of two fields) and feeds these pulses to divide by two logic circuit 414. The pulses (shown in FIG. 5A) which now go "High" every other frame are used to select the odd or even frames of video. This pulse train is then applied to high peak power LED driver 415. LED driver 415 turns on LED illuminators 110 surrounding the edge of the touch-screen for a short duration (approximately 1 millisecond) and at a higher power than could have been sustained if the LEDs were driven continuously.

The timing circuits of LED driver 415 (not shown) are adjusted so that LEDs 110 are only lit when the shutter of camera 131 is open. Every other frame (each two fields) captured by camera 131 is generated when the LED illuminators 110 are at a higher power. Thus, successive frames of video are generated, where the generated frames alternate between having the LED illuminators 110 on and off.

In one embodiment, the odd frames can arbitrarily be the frames where the LED illuminators 110 are on, and the even frames can be the frames where the LED illuminators are off. The even and odd frames are stored in separate frame buffers 412 and 413. The even frame store 412 and the odd frame store 413 receive frame store signals 418 and 419 from sync separator 411. The stored frames are then subtracted with the analog value of each corresponding pixel in one frame being subtracted from the analog value of the pixel in the other frame, Thus, the output of the frame subtractor is the difference between frames where the LEDs are lit and unlit. Because both frames are lit by the background illumination, and only one has the illumination of the LED illuminators 110, the difference between the two frames is the illumination of the LED illuminators 110. In the subtracted output shown in FIG. 5C, the illumination due to the background is eliminated.

Since LED illuminators 110 are operated intermittently, they can be driven with much higher peak powers than if illuminators 110 were continuously lit. Indeed, their peak power can be increased roughly inversely to their duty cycle. As a result, the instantaneous signal-to-noise ratio at the time of the shutter opening can be improved by a factor of ten or more. Finally, the subtraction of the video signals cancels nearly all of the ambient light that occurred during the brief shutter opening.

Figure 5C:
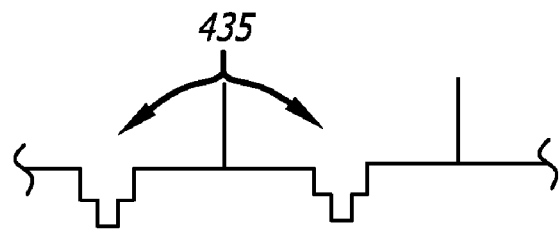

To illustrate the improvement due to system 410, typical video information acquired when LED illuminators 110 are operated in the manner described above is shown in FIG. 5B. As shown, finger touch electrical signals 430 may only be slightly above the noise level contributed by ambient illumination. When waveform 451 (background level of ambient illumination with LED illuminators 110 off), is subtracted from waveform 452 (signal with LED illuminators 110 on), resulting illumination spikes 435 due to finger tip touch as shown in FIG. 5C are clearly evident and are easily detectable from the background level.

Two-Camera Subtractive Processing

Figure 6:
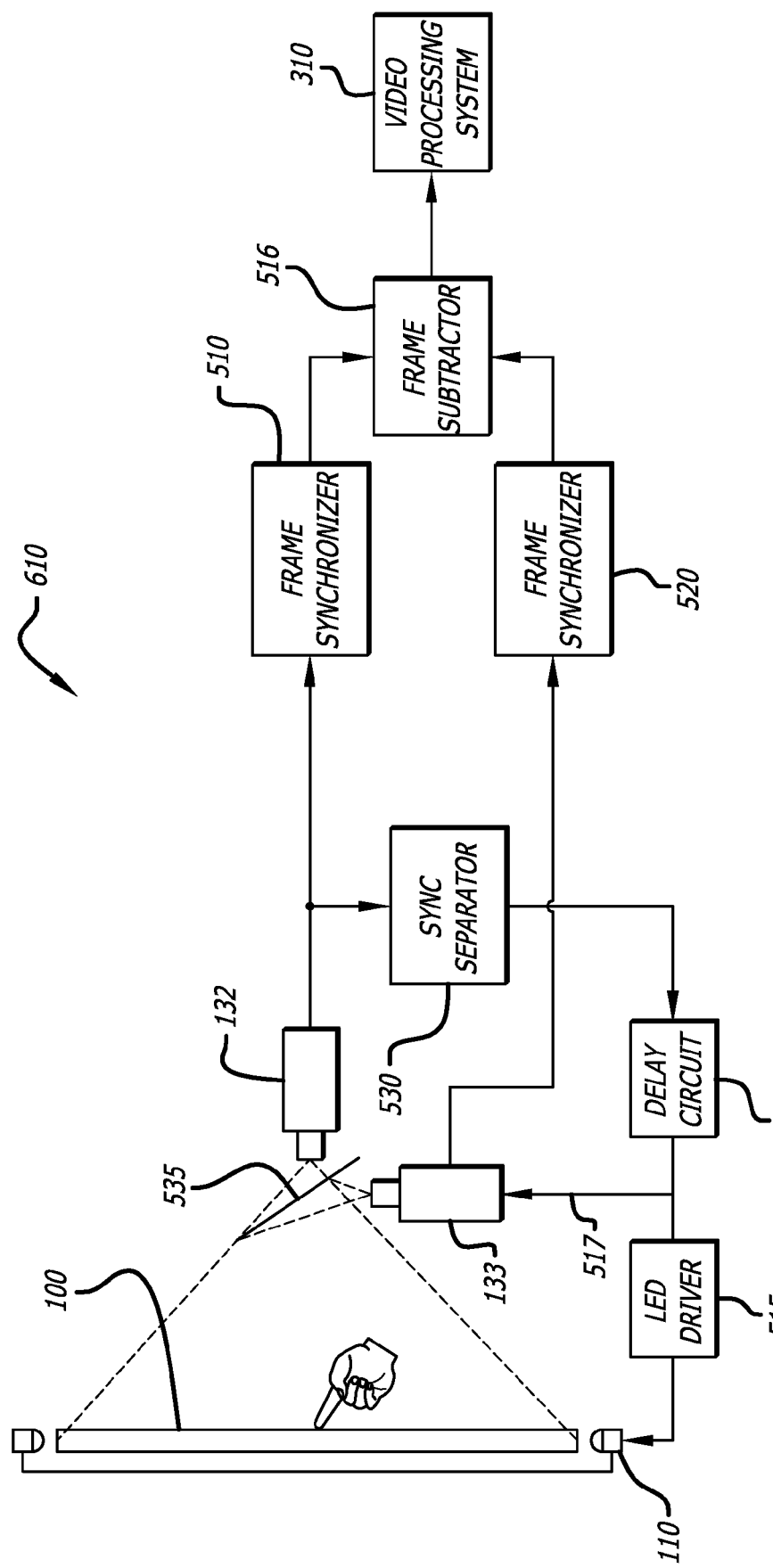
FIG. 6 illustrates a touch-screen system to increase the signal-to-noise ratio.

FIG. 6 illustrates a touch-screen system 610 to increase the signal-to-noise ratio. In one embodiment, two shutter cameras 132 and 133 can be used instead of a single shutter camera. In the case of rapid touch or hand movement on the slab 100, the use of subtraction of successive frames spaced by one thirtieth of a second can cause a mismatch in the subtracted images. This is produced because the subtraction technique replaces the frame that does not include the LED illuminator's light with a noise-free frame. When the touch of a user comprises a rapid movement across the slab 100, the replaced frame can be lost and replaced by an older position of the touch. A standard shutter of a camera has a delay of about one thirtieth of a second from frame to frame. As such, the replaced frame will be one thirtieth of a second older than the original frame. When movement of the touch is slow, such replacement is immaterial. However, with faster touch movements across the slab 100, the replacing frame can be significantly different from the original frame thus creating a mismatch in touch signal. Thus, two shutter cameras 132 and 133 can be utilized to increase performance and prevent such mismatch.

Shutter cameras 132 and 133 can be triggered a small interval of time apart (e.g., one millisecond). When the lit and unlit frames of video are subtracted from each other, the frames occur close in time which ensures that movement between frames does not cause a mismatch in the positions of the images of the fingertip that are subtracted.

For example, when shutter camera 132 focuses on slab 100 and captures light from the slab 100, a sync separator 530 receives the output from shutter camera 132 which is then relayed to a delay circuit 514. The delay circuit 514 generates a delayed sync signal 517 which genlocks shutter camera 133. The delayed sync signal 517 is also transmitted to LED driver 515 in order to turn on LED illuminators 110. This arrangement guarantees that the shutter for camera 133 and LED illuminators 100 receive a signal simultaneously, the signal being received after the shutter in shutter camera 132 has opened and closed. The overall effect is that shutter camera 133 is synchronized to open and close when LED illuminators 110 are turned on, and that shutter camera 132 opens and closes before the LED illuminators 110 are illuminated.

This permits an unlit frame signal to be transmitted to frame synchronizer 510 and a lit signal to be transmitted to frame synchronizer 510. The frame synchronizer 516 then receives the two signals coming from two different shutter cameras 132 and 133 and subtracts them.

Figure 7A:
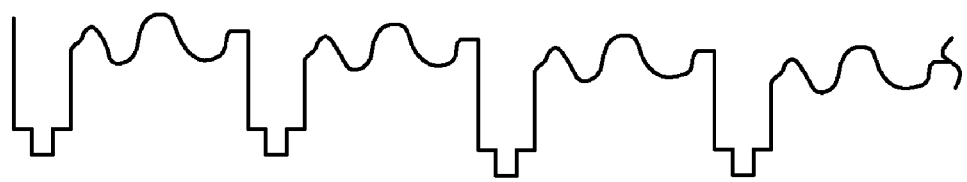
FIGS. 7A-7C illustrate the video waveforms corresponding to two separate cameras viewing a touch-screen.
Figure 7B:
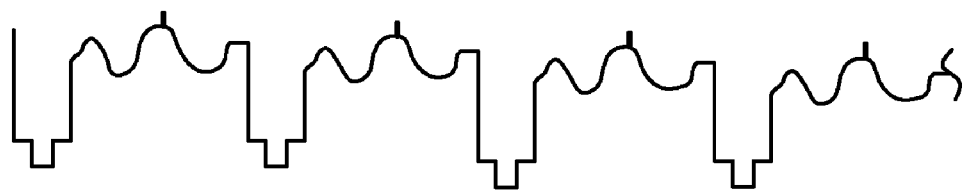
Figure 7C:
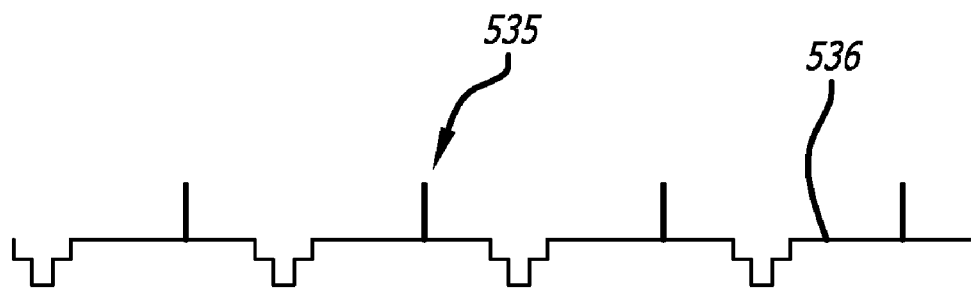

FIGS. 7A through 7C are representative waveforms for the two-camera method for signal to noise improvement. A typical output waveform for shutter camera 132 is illustrated in FIG. 7A while a typical output for shutter camera 133 is illustrated in FIG. 7B. As explained above, the two video signals are aligned by frame synchronizers 510 and 520 respectively. Both frame synchronizers 510 and 520 are locked to a common gunlock source (not shown). Frame subtractor 516 subtracts the realigned camera 132 signal from the camera 133 signal. The resultant signal from frame subtractor 516 is illustrated in FIG. 7C and has a high signal-to-noise ratio where only touch positions 535 stand out from the remaining subtracted ambient level 536.

Touch Screen with Display

Figure 8:
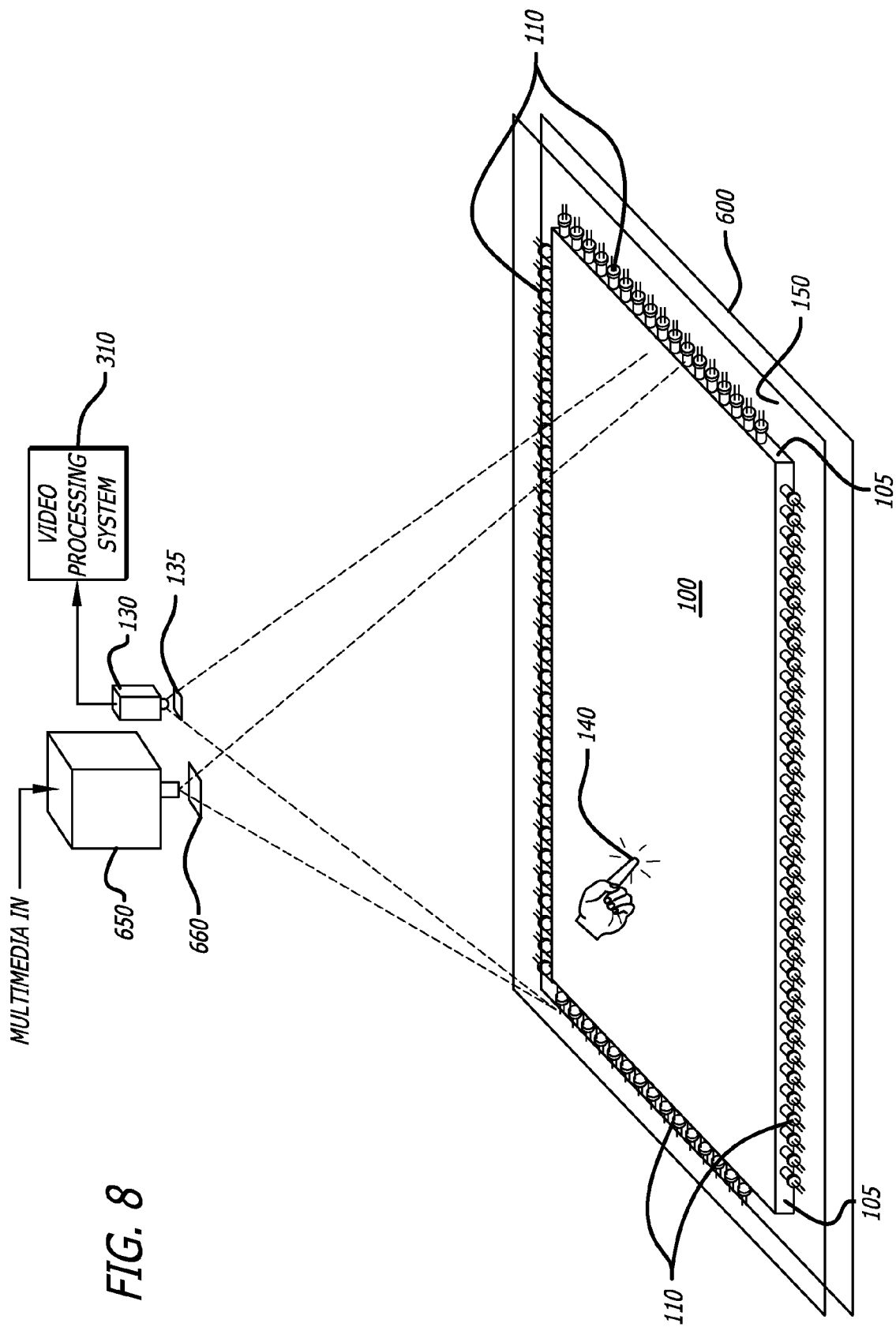
FIG. 8 illustrates a touch-screen system including a projector and diffusing layer.

FIG. 8 illustrates a touch-screen system including a projector and diffusing layer. In one embodiment, the slab 100 can be used as a display as well as a touch-detecting surface. A visible light diffusing layer 600 along with layer 150 can be placed below slab 100. A visible-light image projector 650 projects upon light diffusing layer 600. The image can be projected through slab 100 and layer 150. The layer 150 performs the same function as described above. Namely, the layer 150 permits the light scattered by the underside of the fingertip 140 to be reflected back towards the fingertip 140.

If the light emitted by LED illuminators 110 is infrared light, the image projector 650 can be equipped with an infrared blocking filter 660 mounted in front so as to block any traces of infrared light that can be emitted by image projector 650. The blocking of any infrared light coming from projector 650 prevents interference with the light emitted from LED illuminators 110 on slab 100. The projector 650 can be aligned with camera 130 such that the field of vision of the camera 130 is similar to the area of projection of projector 650.

In one embodiment, a touch drawing surface system can be configured by transmitting the output of camera 130 to the video processing system 310 and projecting an image through projector 650 on light diffusing layer 600 as the output display.

In another embodiment, the image projector 650 can be used to project the output of any interactive multimedia (e.g. an application on a personal computer) onto the light diffusing layer 600. The user interaction on the slab 100 captured by camera 130 can be used as user input. Thus, the touch screen system can function as an input device that relays user instructions to a personal computer to interact with the projected application.

Camera Opposite the Touch Point

Figure 9:
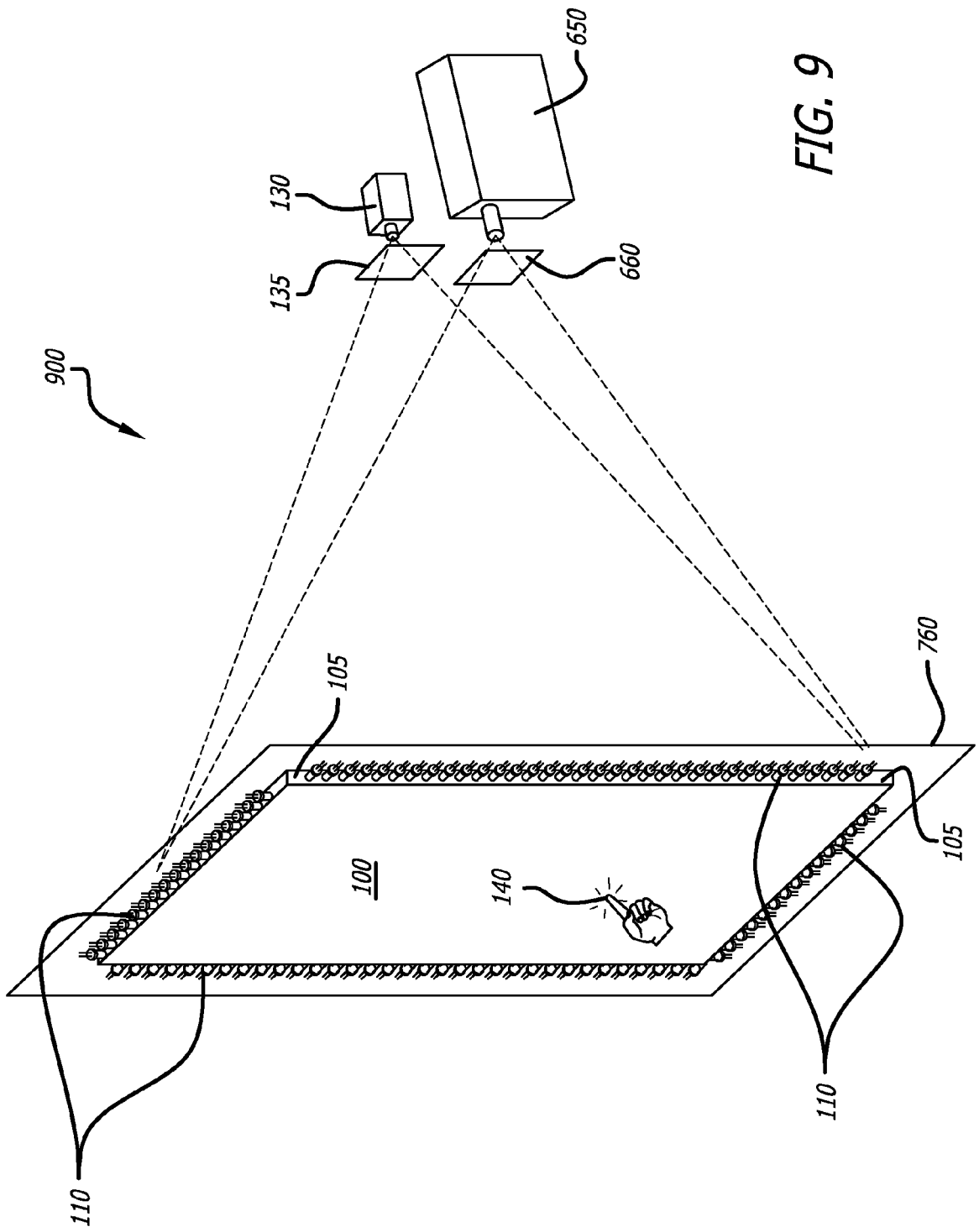
FIG. 9 illustrates a touch-screen system where a fingertip touch occurs on one side of the touch surface, and the projection and detection occurs on the opposite side of the touch surface.

FIG. 9 illustrates a touch-screen system where a fingertip 140 touch occurs on one side of the touch surface, and the projection and detection occurs on the opposite side of the touch surface. In one embodiment, the slab 100 and a diffusing screen 760 can be positioned vertically. The camera 130 and projector 650 can be mounted opposite to the location of the fingertip 140 touch. The diffusing screen 760 is mounted between the slab 100 and the projector 650. Furthermore, the diffusing screen 760 can be translucent so as to permit visible-light to pass through. The projector 650 projects images onto the diffusing screen 760. Because the diffusing screen 760 is translucent, the images projected by projector 760 can be seen by the person touching the slab 100. In one embodiment, the diffusing screen 760 is capable of supporting a high quality, high-contrast, visible image while also allowing light to pass through with relatively low attenuation. On such screen can be of material similar to that provided by the Blackscreen™ projection screen material from Jenmar Systems Inc.

Touch-Screen Configurations

Figure 10:
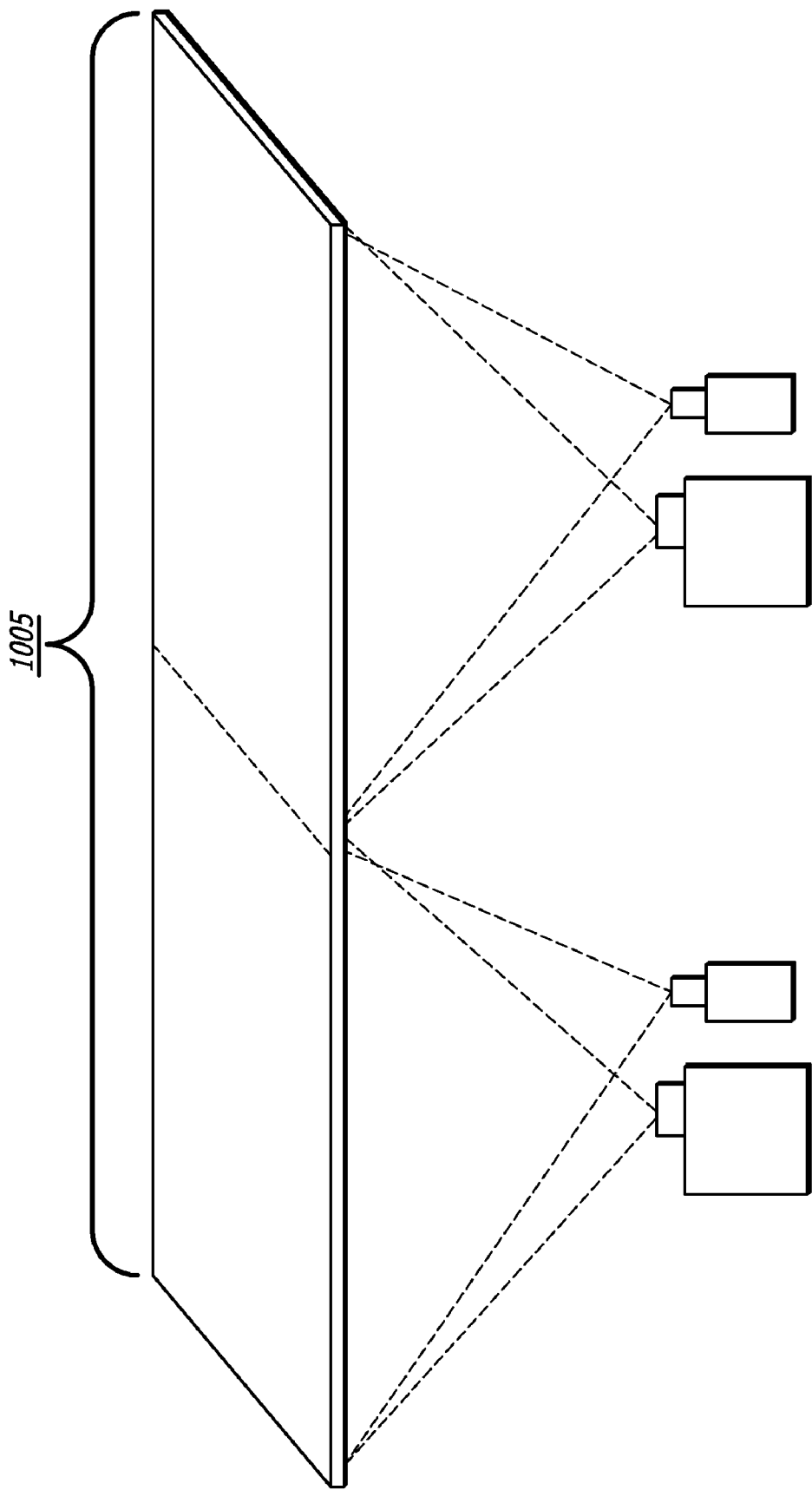
FIG. 10 illustrates a touch-screen system having at least two set of projectors and cameras.

FIG. 10 illustrates a touch-screen system 1005 having at least two sets of projectors and cameras. Touch-screens of very large size or in aspect ratios not matching the standard aspect ratio of video cameras may be provided by use of system 1005. Multiple cameras and projectors, or any combination of cameras and projectors needed to cover the area can be combined to form the touch-screen system 1005. The multiple camera and projector arrangement provides the flexibility to have touch-screen systems of varying sizes and arrangement. As such, the multiple slabs, for example, can be arranged in the shape of an object, etc.

Figure 11:
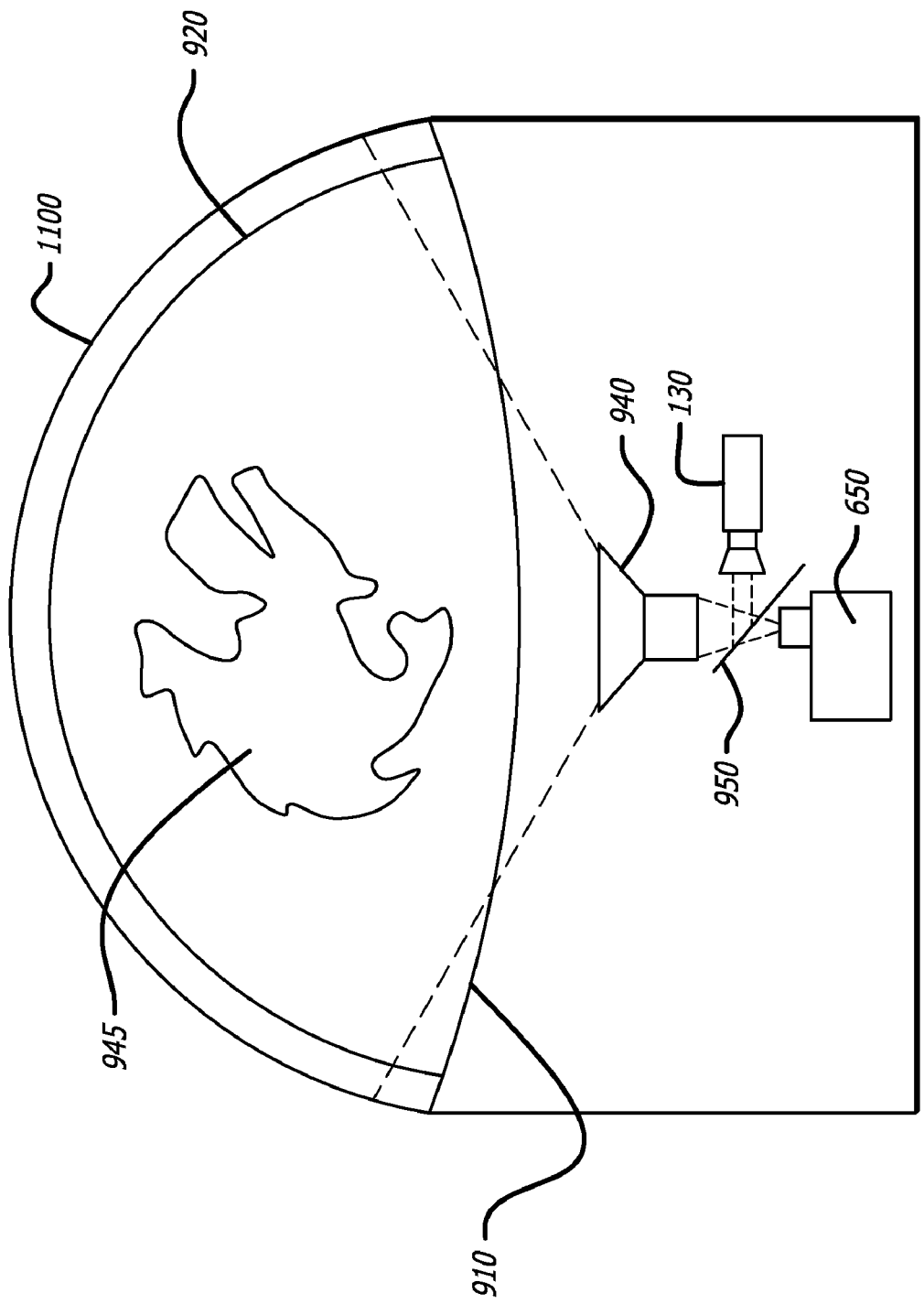
FIG. 11 illustrates a curved touch-screen.

FIG. 11 illustrates a curved touch-screen. In one embodiment, a slab 1100 can be used. The slab 1100 can have a hemispherical shape. Light such as infrared light can be injected into the hemispherical light-conducting slab 1100 at the periphery 910 of the circular base of the hemisphere. The slab 1100 can have a lip that allows the LED illuminators 110 to be mounted and which can conduct infrared light into the entire surface of the hemisphere.

A second, hemispheric inner projection surface 920 is mounted close to, but not in contact with the slab 1100. The inner projection surface 920 serves as a translucent projection surface for video projector 650. In one embodiment, projector 650 is equipped with extreme wide-angle projection lens 940 to project a substantially distortion-free hemispherical image 945 from inside the hemisphere onto the inner projection surface 920.

A beam-splitter hot-mirror 950 is used to allow camera 970 to observe the light projected on slab 1100 by co-linearly sighting along the optical path of the projector 650. Hot mirror 950 allows visible light from projector 650 to pass substantially unaffected while directing non-visible light coming from slab 1100 towards camera 130. As the surface of the outer sphere is touched, light leaking from this sphere is detected through the inner sphere by camera 130.

In one embodiment, the image projected is a world globe image 945. By use of a touch-screen system as described herein, the projected image can change and be made to respond as though it were a physical object. For instance, the world globe image 945 can rotate according to the direction of movement of the fingertip 140 touch. Thus, the user can have the illusion of rolling the earth on any axis the user may choose. The direction and speed of the rotation are changeable depending on the movement of the user's fingertip 140 on the slab 1100.

Index Matching of Intermediary Layer

In another embodiment, a touch-screen system is disclosed that is not directly dependent on the movement and position of the touch by a fingertip 140, but rather also the pressure of the fingertip 140 touch.

Figure 12:
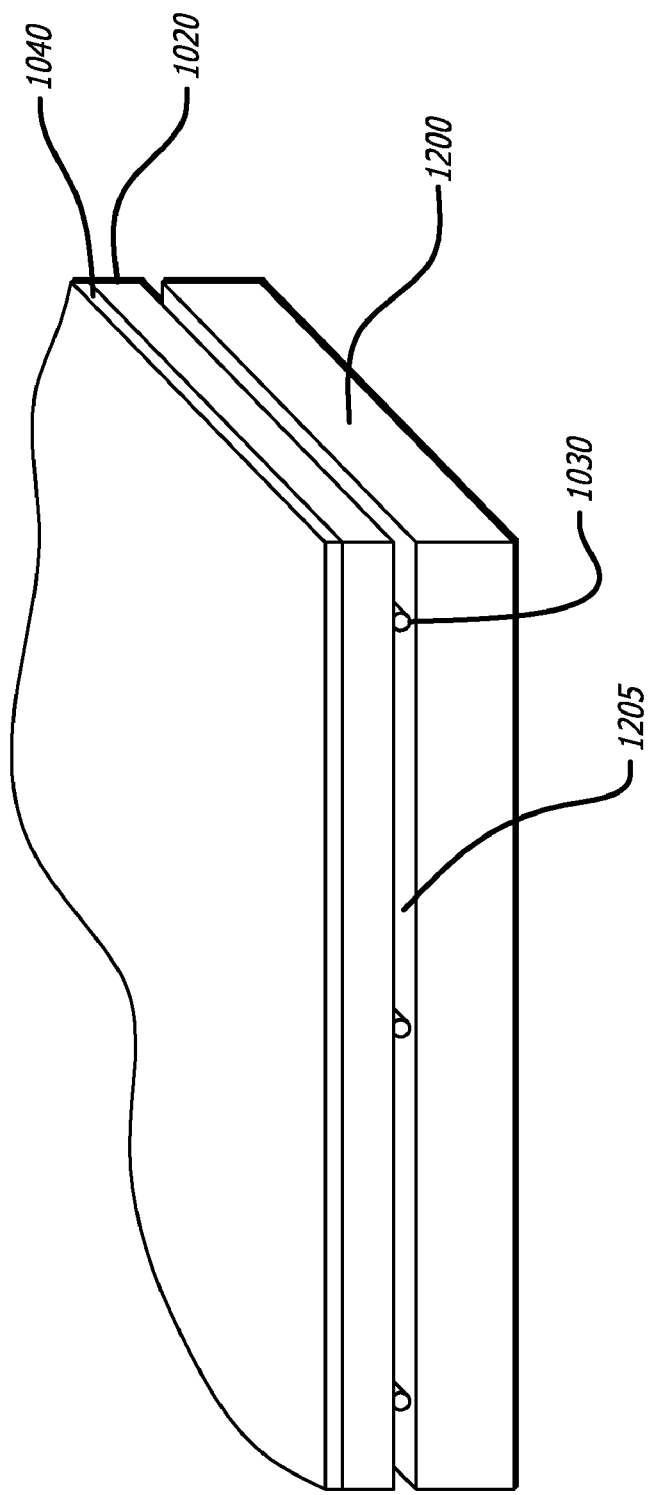
FIG. 12 illustrates a cross section of a touch-screen that uses an intermediate layer to index-match to a slab.

FIG. 12 illustrates a cross section of a touch-screen that uses an intermediate layer 1020 that index-matches to a slab 1200. In one embodiment, the intermediate layer can be made of pliable, optically diffusive, rubber-like material. In another embodiment, the layer can be made of pliable transparent material. Furthermore, the slab 1200 can be layered with optical spacers 1030. Examples of spacers would be fine metal wires, optical fibers, monofilament fishing line or other thread-like materials, glass spheres, etc. The optical spacers 1030 form an air layer 1205 that prevents any leaking of the light from the slab 1200 to the index-matching layer 1020. Thus, an index-matching layer 1020 is kept separated from the light filled slab 1200. Optionally, a layer 1040 of pliable transparent material, such as a thin layer of Plexiglass®, is layered on top of the index-matching layer 1020 so as to protect the compliant layer and provide a surface that feels hard, flat, and smooth to the user.

A fingertip touch with enough pressure can cause the layer 1040 and the underlying index-matching layer 1020 to flex so that the index-matching layer 1020 makes physical contact with the light-filled slab 1200. At the places where this contact occurs, light leaks into the intermediate soft diffusing material and from there it is either dispersed downwards or upwards into the detection camera such as camera 130 shown in FIG. 2. A touch firm enough to force the index-matching layer 1020 into contact with slab 1200 permits the leaking of the light in the slab 1200 regardless of the optical index of refraction of the object causing the deflection.

Magic Footprints

Figure 13:
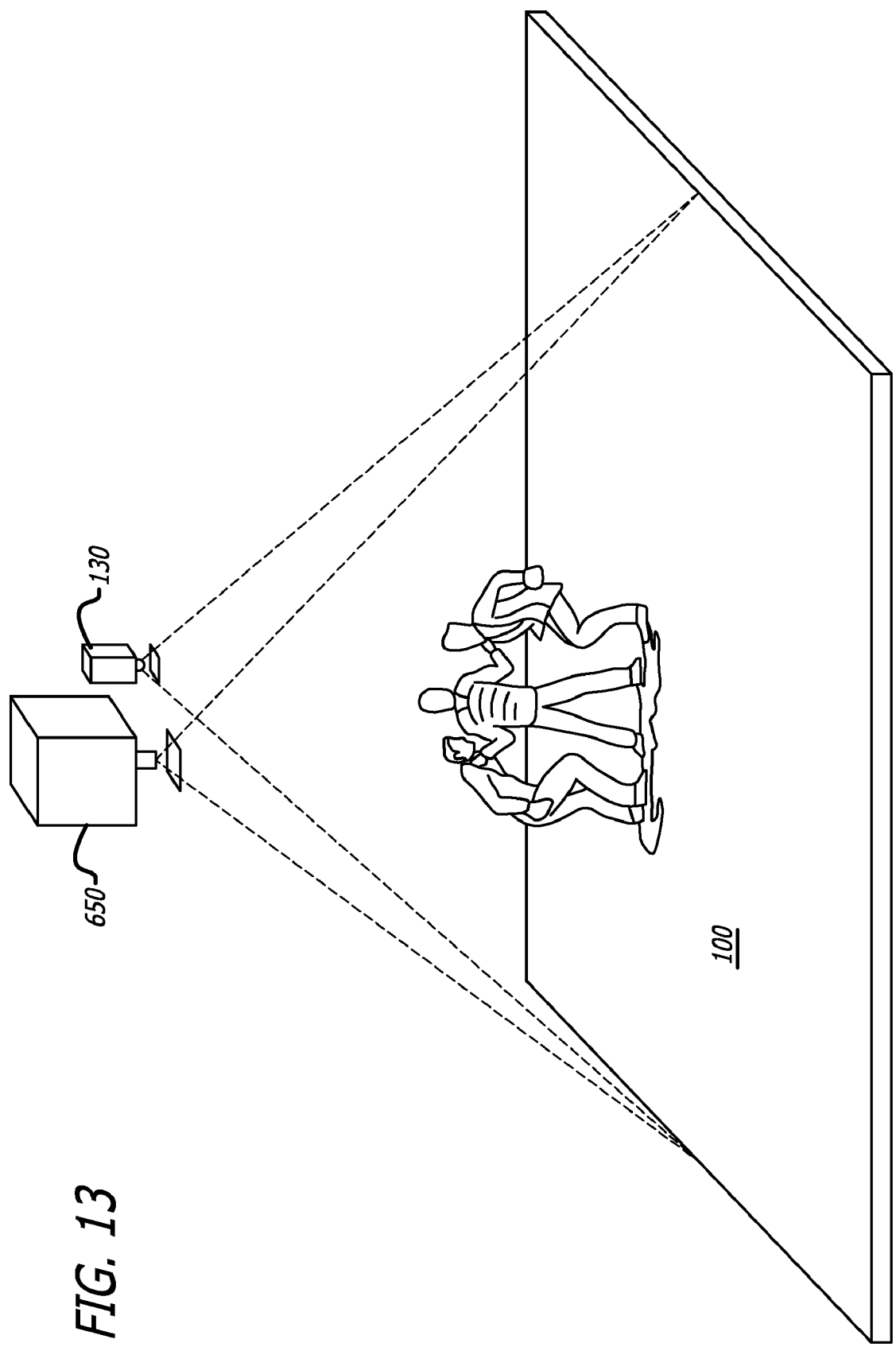
FIG. 13 illustrates a touch-screen system covering the floor of a room.

FIG. 13 illustrates a touch-screen system covering the floor of a room. In one embodiment, a very large slab 100 can be utilized so as to cover, for example, the floor of a room. The floor surface can include a touch-screen 1200 layered as illustrated in FIG. 12, except that the protective layer 1040 could be replaced with a translucent and durable rubber-like treaded surface. Furthermore, the diffusive layer 1020 can be primed to temporarily adhere to the underlying slab 100 for a short period of time.

Thus, as the user walks on the surface, and moves from point to point, the user leaves a momentary trail of "stuck" down "glowing" light footprints. This latency of surface release is required so that the users' shoes, and entire body, which would block the camera 130 from seeing the floor during the time that the user is actually standing in the area to be sensed can move out of the way.

In yet a further embodiment, the position of the footfalls of a person can be determined and images of the steps can be projected on the index-matching layer 1020. In another embodiment, the images of the steps can be replaced with other images such as, for instance, large glowing dinosaur footprints while vibration sensors attached to the entire floor can be used to trigger the sound of dinosaur footfalls that add to the user's entertainment.

Magic Screen

Figure 14:
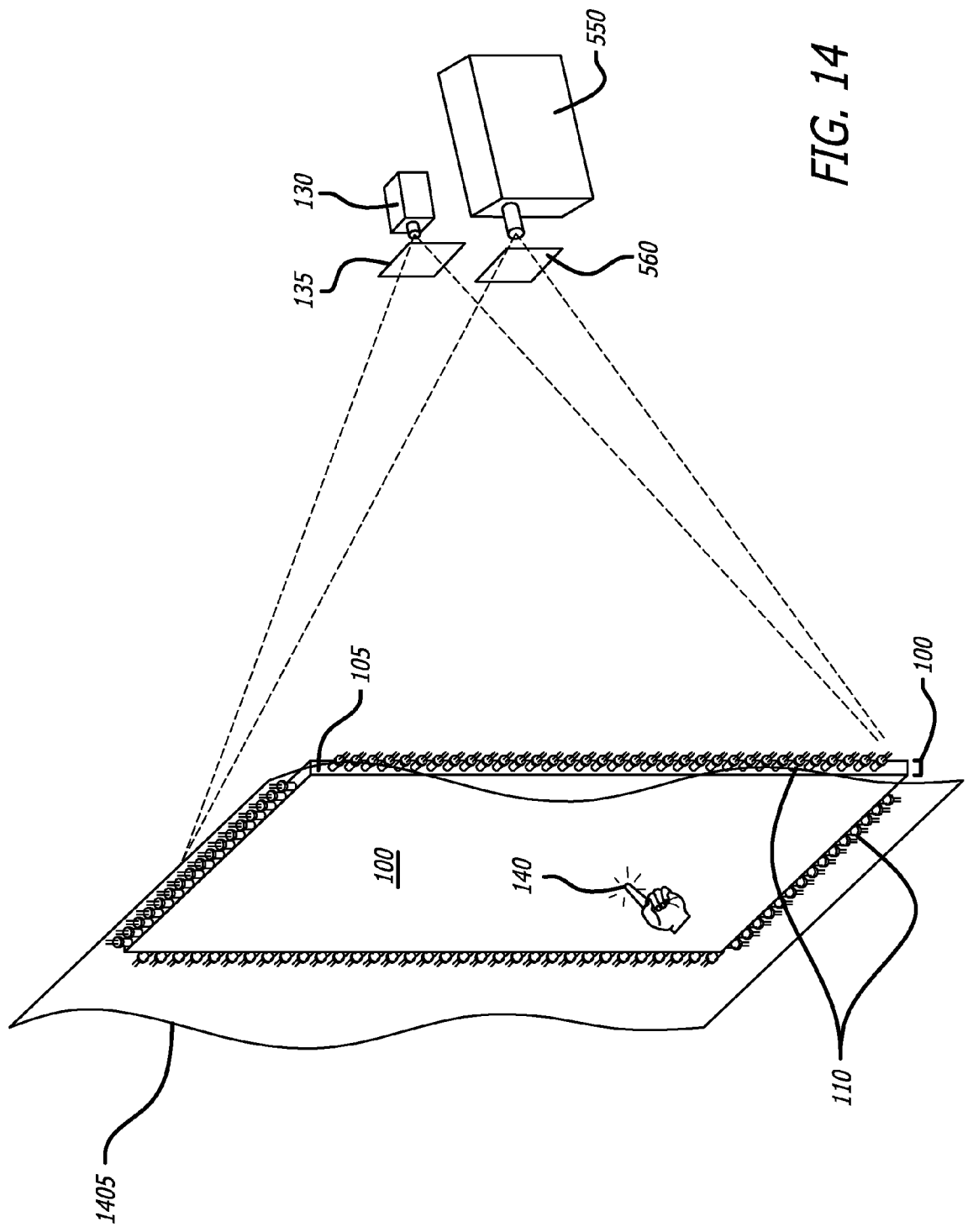
FIG. 14 illustrates a touch-screen system that does not require frame buffers.

FIG. 14 illustrates a touch-screen system which does not require frame buffers to store an image. A thin layer 1405 of pliable, diffusing, plastic material is loosely draped in front of slab 100 such that the layer 1405 of pliable material can be pressed into contact with the slab 100 by fingertip 140 touches or by touch by any solid object. The projector 550 projects an image onto the translucent material of the layer 1405 while camera 130 views the layer 1405 from behind. As pressure created by fingertip 140 pushes the layer 1405 against slab 100 the area of layer 1405 under the fingertip 140 touch adheres to the slab due to Vanderwals forces in the area of the touch. Because of the adhesion, light from the slab 100 leaks into the layer 1405 diffusing light and radiating the light backwards towards the camera 130. The light is observed by the camera 130, and can be directed to an outside computer or display system, or alternatively, fed directly into projector 650. If the camera 130 output is fed to the 550, the projector can project visible light toward the areas where the layer 1405 is in contact with the slab 100. For example, a user can draw on the surface of the layer 1405 with a fingertip 140, or any other object, and wherever the drawing pressure, or other marking is done, a bright luminous trail can be projected on the surface. A user can "clear" the layer 1405 by physically lifting the layer 1405 from the slab 100, hence removing the semi-adherence to the slab 100 and therefore removing the light leakage into the layer 1405. As such, layer 1405 functions as a "memory" that keeps images stored by the adherence of the layer 1405 to the surface of the slab 100.

Although certain illustrative embodiments and methods have been disclosed herein, it can be apparent form the foregoing disclosure to those skilled in the art that variations and modifications of such embodiments and methods can be made without departing from the true spirit and scope of the art disclosed. Many other examples of the art disclosed exist, each differing from others in matters of detail only. For example the light source can emit any form of electromagnetic wave that can be captured by a camera of the same wavelength. Accordingly, it is intended that the art disclosed shall be limited only to the extent required by the appended claims and the rules and principles of applicable law.

I claim:

1. A method of detecting touch on a touch-screen surface, comprising:
    providing a transparent slab, the transparent slab comprising a top surface and a bottom surface, and at least one side edge;
    injecting light into the transparent slab by placing at least one light source on the at least one side edge of the transparent slab, the at least one light source being placed so as to cause light injected in the transparent slab to be totally internally reflected in the transparent slab so that the top surface and the bottom surface of the transparent slab emit a minimum amount of light;
    receiving touch on the transparent slab with a body part of the user, wherein the touch of the user on the transparent slab disrupts the total internal reflection of a portion of the light thereby causing the portion of the light to be refracted into the body part of the user; and capturing with a camera the portion of the light refracted into the body part of the user due to the touch of the body part on the transparent slab,
    wherein the camera is a shutter camera, the method further comprising:
    turning the at least one light source on;
    capturing a first video frame with the shutter camera so as to capture ambient light and the portion of the light refracted into the body part of the user;
    turning the at least one light source off;
    capturing a second video frame with the shutter camera so as to capture the ambient light; and
    subtracting the second video frame from the first video frame to create a third video frame that excludes ambient light, wherein the third video frame includes a signal representative of the touch of the user on the transparent slab.

2. The method of claim 1, wherein the top surface and the bottom surface are smooth.

3. The method of claim 1, wherein the transparent slab is made of glass.

4. The method of claim 1, wherein the transparent slab is made of plastic.

5. The method of claim 1, wherein the transparent slab is made of plastic and glass.

6. The method of claim 5, further comprising projecting an image on a projection screen that is separate from the transparent slab.

7. The method of claim 1, further comprising projecting an image on a computer monitor that is separate from the transparent slab.

8. The method of claim 1, wherein the user touches the top surface of the transparent slab with a finger, the camera capturing the light being refracted into the finger.

9. The method of claim 1, wherein the user touches the bottom surface of the transparent slab with a finger, the camera capturing the light being refracted into the finger.

10. The method of claim 1, wherein the camera further captures a subportion of the light that was refracted into the body part and reflected off the body part onto the transparent slab.

11. The method of claim 1, wherein the camera captures the portion of the light refracted into the body part of the user and transmits a signal to a computer system as user input.

12. The method of claim 11, wherein the computer system, as a response to the user input, transmits to a projector an image to be projected on a projection screen.

13. The method of claim 11, wherein the computer system, as a response to the user input, transmits to a projector an image to be projected on a computer monitor.

14. The method of claim 11, wherein the computer system, as a response to the user input, transmits to a projector an image to be projected on a diffusing surface.

15. The method of claim 11, wherein the computer system is a video processing system that interprets the captured portion of the light as a touch signal.

16. The method of claim 11, wherein the signal is representative of the X and Y position of the light refracted into the body part of the user with respect to the transparent slab.

17. The method of claim 1, wherein the camera captures as an electrical signal the portion of the light refracted into the body part of the user, the electrical signal being transmitted to a computer system as user input.

18. The method of claim 1, wherein the transparent slab is flat.

19. The method of claim 1, wherein the transparent slab is curved.

20. The method of claim 1, wherein the time between turning the at least one light source on and turning the at least one light source off is one millisecond.

21. The method of claim 1, further providing a plurality of transparent slabs that are positioned side by side.

22. The method of claim 21, further comprising a plurality of cameras that capture each of the plurality of slabs.

23. The method of claim 1, wherein the camera is configured to detect a greater presence of light when the body part of the user exerts high pressure on the transparent slab.

24. The method of claim 1, further comprising providing a flexible transparent sheet applied on the top surface of the transparent slab, the flexible transparent sheet being separated from the transparent slab by separators that create a thin layer of air.

25. The method of claim 24, wherein the flexible transparent sheet can be pressed against the transparent slab thereby permitting a portion of the light to refract into the body part of the user.

26. The method of claim 25, further comprising releasing pressure off the flexible transparent sheet, wherein the flexible transparent sheet is immediately released away from the transparent slab so as to restore the thin layer of air.

27. The method of claim 25, further comprising releasing pressure off the flexible transparent sheet, wherein the flexible diffusing sheet is released away from the transparent slab after a predetermined amount of time so as to restore the thin layer of air.

28. The method of claim 25, further comprising releasing pressure off the flexible transparent sheet, wherein the flexible transparent sheet remains pressed against the transparent slab.

29. A method of detecting touch on a touch-screen surface with an improved signal-to-noise ratio, comprising:
providing a transparent slab, the transparent slab comprising a top surface and a bottom surface, and at least one side edge;
injecting light into the transparent slab by placing at least one light source on the at least one side edge of the transparent slab, the at least one light source being placed so as to cause light injected in the transparent slab to be totally internally reflected in the transparent slab; receiving touch on the transparent slab with a body part of the user, wherein the touch of the user on the transparent slab disrupts the total internal reflection of a portion of the light thereby causing the portion of the light to be refracted into the body part of the user; and turning the at least one light source on;
capturing a first video frame with a first shutter camera so as to capture ambient light and the portion of the light refracted into the body part of the user;
turning the at least one light source off;
capturing a second video frame with a second shutter camera so as to capture the ambient light; and
subtracting the second video frame from the first video frame to create a third video frame that excludes ambient light, wherein the third video frame includes a signal representative of the touch of the user on the transparent slab.

30. The method of claim 29, wherein the transparent slab is flat.

31. The method of claim 29, wherein the transparent slab is curved.

32. The method of claim 29, wherein the camera captures the portion of the light refracted into the body part of the user and transmits a signal to a computer system as user input.

33. The method of claim 32, wherein the computer system, as a response to the user input, transmits to a projector an image to be projected on a projection screen.

34. The method of claim 29, further comprising providing a flexible transparent sheet applied on the top surface of the transparent slab, the flexible transparent sheet being separated from the transparent slab by separators that create a thin layer of air.

35. A system to detect touch on a touch-screen surface, comprising:
a transparent slab, the transparent slab comprising a top and a bottom surface, and at least one side edge;
at least one light source placed to inject light in the at least one side edge of the transparent slab, wherein the light injected in the transparent slab is totally internally reflected in the transparent slab so that the top surface and the bottom surface of the transparent slab emit a minimum amount of light; and
a camera configured to capture at least one spot of light in the transparent slab, wherein the at least spot of light is created by a user touching the transparent slab with a body part, wherein the touch of the user on the transparent slab disrupts the total internal reflection of a portion of the light thereby causing the portion of the light to be refracted into the body part of the user,
wherein the camera is a shutter camera configured to capture a first video frame comprising a spot of light in the transparent slab when the at least one light source is turned on, wherein the camera is further configured to capture a second video frame with the shutter camera so as to capture the ambient light when the at least one light source is turned off, the system further comprising:
a subtractor that subtracts the second video frame from the first video frame to create a third video frame that excludes ambient light, wherein the third video frame includes a signal representative of the touch of the user on the transparent slab.

36. The system of claim 35, wherein the transparent slab is comprised of a layer of plastic material and a layer of glass.

37. The system of claim 35, wherein the transparent slab further comprises a transparent sheet applied on the top surface of the transparent slab in order to protect the transparent slab.

38. The system of claim 37, wherein the transparent slab is comprised of a layer of plastic material and a layer of glass.

39. The system of claim 35, further comprising a pliable index-matching layer, with spacers, then through pressure, and then it lights up, in order to be detected instantly.

40. The system of claim 35, further comprising a video processing system that includes a video peak detector to detect the X and Y position and brightness of blobs of light on the transparent slab.

41. The system of claim 35, wherein the camera captures as a video frame the portion of the light refracted into the body part of the user, the video frame being transmitted to a computer system as user input.

42. The system of claim 41, further comprising a projector, wherein the computer system, as a response to the user input, transmits to the projector an image to be projected on a diffusing surface, the diffusing surface being separate from the transparent slab.

43. The system of claim 35, further comprising a first frame store wherein the first frame is stored before subtraction occurs, and a second frame store wherein the second frame is stored before subtraction occurs.

44. The system of claim 35, further comprising a synchronizing unit that is configured to simultaneously send a signal to shutter camera and to the at least one light source such that the shutter camera can capture the first frame when the at least one light source is on, and the second frame when the at least one light source is off.

45. A system to detect touch on a touch-screen surface, comprising:
   a transparent slab, the transparent slab comprising a top and a bottom surface, and at least one side edge;
   at least one light source placed to inject light in the at least one side edge of the transparent slab, wherein the light injected in the transparent slab is totally internally reflected in the transparent slab so;
   a first shutter camera configured to capture a first video frame comprising a spot of light in the transparent slab when the at least one light source is turned on, wherein the spot of light is created by a user touching the transparent slab with a body part, wherein the touch of the user on the transparent slab disrupts the total internal reflection of a portion of the light thereby causing the portion of the light to be refracted into the body part of the user;
   a second shutter camera configured to capture a second video frame comprising ambient light near the transparent slab when the at least one light source is turned off; and
   a subtractor that subtracts the second video frame from the first video frame to create a third video frame that excludes ambient light, wherein the third video frame includes a signal representative of the touch of the user on the transparent slab.

46. The system of claim 45, further comprising a first frame store wherein the first frame is stored before subtraction occurs, and a second frame store wherein the second frame is stored before subtraction occurs.

47. The system of claim 45, further comprising a synchronizing unit that is configured to simultaneously send a signal to shutter camera and to the at least one light source such that the shutter camera can capture the first frame when the at least one light source is on, and the second frame when the at least one light source is off.

* * * * *